April 27, 1965 M. FELCHECK 3,181,009

MONOSTABLE PULSE GENERATOR FOR PRODUCING PULSES OF UNIFORM TIME DURATION TO ENERGIZE AN INDUCTIVE LOAD

Filed Dec. 14, 1962

INVENTOR.
Marvin Felcheck

BY Stewart F. Moore

ATTORNEY

United States Patent Office 3,181,009 Patented Apr. 27, 1965

3,181,009
MONOSTABLE PULSE GENERATOR FOR PRODUCING PULSES OF UNIFORM TIME DURATION TO ENERGIZE AN INDUCTIVE LOAD

Marvin Felcheck, Bayside, N.Y., assignor to American Machine & Foundry Company, a corporation of New Jersey Filed Dec. 14, 1962, Ser. No. 244,672
5 Claims. (Cl. 307—88.5)

This invention relates to monostable pulse generating circuits, and while not limited thereto, relates to monostable pulse generating circuits which are particularly useful for energizing inductive loads.

Monostable circuits are generally used to provide uniform output pulses with sharp turn-on and turn-off characteristics. Conventional monostable circuits utilize transistors as active elements and therefore cannot easily be adopted to provide output pulses of a very substantial magnitude. This is particularly true where the load being energized is a relay winding or like inductive device, since a transistor must be abnormally large to withstand the reverse voltage generated by an inductive load when the magnetic field collapses.

A unique monostable circuit for supplying high amplitude currrent pulses to inductive loads is described in a copending application by William J. Mahoney, Serial No. 181,337, filed March 21, 1962, wherein the active element of the monostable circuit is a controlled rectifier capable of passing substantial current when conductive and capable of withstanding the substantial reverse potential generated by an inductive load. With this circuit, it has been found that the time duration of output pulses varies with surrounding ambient temperature and power supply voltage changes, and therefore the circuit of the copending application is limited to installations where the pulse width is not particularly critical.

An object of this invention is to provide an improved monostable pulse generator circuit for providing output pulses of uniform time duration regardless of surrounding ambient temperature and power supply voltage changes.

Another object is to provide a monostable pulse generating circuit capable of providing high amplitude current pulses to inductive loads, these high amplitude current pulses having uniform width regardless of temperature and voltage changes.

The monostable pulse generating circuit in accordance with this invention includes a controlled rectifier which, when conductive, permits energization of the load device. The instant the controlled rectifier becomes conductive, an associated timer circuit is activated. The timer circuit includes either a controlled switch or an unijunction transistor as an active element which is connected so that the active element is insensitive to temperature changes, but has a firing potential which varies in accordance with the power supply voltage. A capacitor, which charges at a rate proportional to the power supply voltage when the timer circuit is activated, is connected to discharge through the active element to provide a timing pulse at a predetermined time interval after the controlled rectifier has initially been placed in the conductive state. The timing pulse is amplified by a four-layer diode pulse amplifier circuit and is applied in such manner as to cause the controlled rectifier to return to the nonconductive state.

The aforementioned objects and features, as well as other objects and features of this invention, can better be understood by referring to the following specification and drawings, the drawings forming a part of this specification and wherein.

Figure 1:
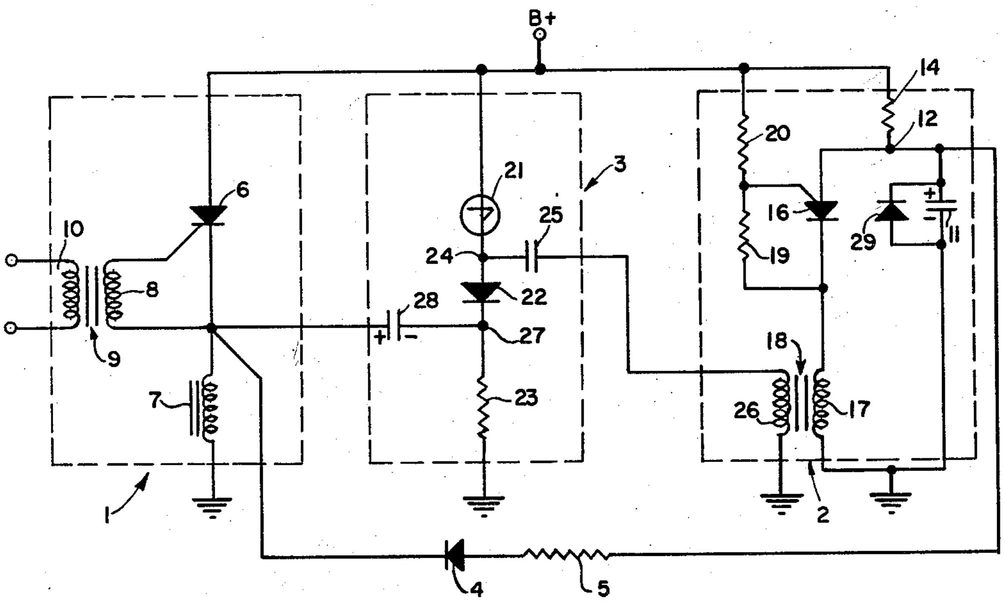
FIG. 1 is a schematic diagram illustrating one embodiment of the invention.

As shown in FIG. 1, the monostable pulse generating circuit in accordance with this invention includes an input circuit 1, a timer circuit 2, and a pulse amplifier circuit 3. A diode 4 connected in series with a resistor 5 provides an interconnection between input circuit 1 and timer circuit 2 for selectively activating the timer circuit.

Input circuit 1 includes a controlled rectifier 6 having its anode connected to a positive source of potential B+ and its cathode connected to ground via an inductive load 7. The gate element of controlled rectifier 6 is connected to one end of a secondary winding 8 of a transformer 9, the other end of the secondary winding being connected to the cathode of the controlled rectifier. A primary winding 10 of transformer 9 is adapted to receive trigger pulses which trigger the controlled rectifier into the conductive state.

The controlled rectifier 6 is a silicon four-layer PNPN type semiconductor, the outer P and N layers forming the anode and cathode respectively. The intermediate P layer is connected as the gate element. Normally, the controlled rectifier is nonconductive and blocks current flow in either direction. However, when a positive potential is applied at the gate with respect to the cathode, the controlled rectifier breaks down and becomes conductive, permitting currrent flow from anode to cathode, and by internal regeneration thereafter remains conductive. Subsequently, the controlled rectifier can be commutated, i.e., returned to the nonconductive state, by reversing the potential between the anode and cathode. The trigger pulses applied to primary winding 10 are of such a polarity that the gate element is momentarily rendered positive with respect to the cathode, and therefore controlled rectifier 6 is triggered into the conductive state whenever a trigger pulse is applied.

Timer circuit 2 includes a capacitor 11 having one plate connected to ground and the other plate connected to the positive source of potential B+ via a resistor 14. The anode of a controlled switch 16 is connected to a junction 12 between capacitor 11 and resistor 14, the cathode of the controlled switch being connected to ground via a primary winding 17 of a transformer 18. A resistor 19 is connected in series with a resistor 20 to form a voltage divider which is connected between the cathode of controlled switch 16 and positive source of potential B+. The injector element of controlled switch 16 is connected to the junction between resistors 19 and 20.

The controlled switch 16 may be a four-layer PNPN semiconductor device, the outer P and N elements forming the anode and cathode respectively. The intermediate N element is the injector. Of the several possible modes of initiating conduction which are available in the controlled switch, the most useful in this invention is to bias the injector at some positive potential and then raise the anode to a given potential, such as .7 volt, above the injector to cause regeneration within the controlled switch and place it in its high conduction state. The injector bias voltage is provided by resistors 19 and 20. It should be noted that the injector voltage and the firing voltage vary in accordance with variations of the power supply voltage. Preferable controlled switch 16 is selected so as to be relatively insensitive to changes in ambient temperature.

Junction 12 is connected to the junction between the cathode of controlled rectifier 6 and the inductive load 7 via the series combination of diode 4 and resistor 5, the cathode of diode 4 being connected to the cathode of controlled rectifier 6. When controlled rectifier 6 is nonconductive, there is substantial potential drop between the anode and cathode of the controlled rectifier and therefore, there is very little potential drop across inductive load 7. Diode 4 is forward biased under these conditions and junction 12 is clamped at essentially ground potential. Thus, capacitor 11 cannot become charged. As soon as controlled rectifier 6 becomes conductive, however, the potential drop across inductive load 7 increases, becoming almost equal to the power supply voltage due to the decrease of anode-cathode impedance of controlled rectifier 6. Diode 4 therefore becomes back biased and the potential at junction 12 is free to rise as capacitor 11 charges. As soon as capacitor 11 charges sufficiently to exceed the firing potential established by the bias voltage at the injector, the controlled switch becomes conductive and discharges the capacitor providing a timing pulse in primary winding 17. It should be noted that the rate at which capacitor 11 charges, and the firing potential of controlled switch 16, both vary in accordance with the power supply voltage, and therefore the time interval required to provide a timing pulse is constant regardless of power supply variations.

Pulse amplifier 3 includes a four-layer diode 21, the anode of which is connected to the positive source of potential B+. The cathode of the four-layer diode is connected to ground via a diode 22 connected in series with a resistor 23. Diode 22 is poled in the same direction as four-layer diode 21. One plate of a capacitor 25 is connected to a junction 24, between the cathode of four-layer diode 21 and the anode of diode 22, and the other plate is connected to one end of a secondary winding 26 of transformer 18, the other end of secondary winding 26 being connected to ground. One plate of a capacitor 28 is connected to a junction 27, between the cathode of diode 22 and resistor 23, and the other plate is connected to the cathode of controlled rectifier 6.

A four-layer diode is also a four-layer PNPN semiconductor and is normally nonconductive to block current flow in either direction. However, when the cathode is driven sufficiently negative with respect to the anode to exceed the break-down potential of the diode, the four-layer diode becomes conductive and thereafter remains conductive by internal regeneration even though the high negative potential applied to the cathode is removed. The four-layer diode can be returned to the non-conductive state by reducing the current flow through the four-layer diode to a value below the holding current level of the four-layer diode.

When controlled rectifier 6 is rendered conductive, there is no substantial potential drop between the anode and cathode of the controlled rectifier and therefore the cathode of controlled rectifier 6 is highly positive. On the other hand, four-layer diode 21, being nonconductive, provides a rather substantial impedance and therefore there is virtually no potential drop across resistor 23. Accordingly, capacitor 28 charges, becoming positive at the plate connected to controlled rectifier 6 and negative at the plate connected to the cathode of diode 22 as indicated in FIG. 1. When controlled switch 16 is subsequently rendered conductive, a positive pulse is developed across primary winding 17, but due to the phase inversion characteristic of transformers, a negative pulse is generated in secondary winding 26 which is applied to the cathode of four-layer diode 21 via capacitor 25. This negative pulse reverse biases diode 22, and therefore the cathode of four-layer diode 21 is driven substantially negative to exceed the breakdown potential of the four-layer diode and render it conductive. As soon as four-layer diode 21 becomes conductive, current flows through four-layer diode 21, diode 22 and resistor 23, driving junction 27 positive. Under these circumstances, because of the charge previously developed across capacitor 28, the cathode of controlled rectifier 6 is driven positive with respect to the anode, thus commutating the controlled rectifier.

The collapse of the magnetic field of inductive load 7 tends to maintain current flow after the controlled rectifier has been commutated. As a result, the cathode of controlled rectifier 6 and junction 27 are driven further positive, this having the effect of reverse biasing four-layer diode 21 and diode 22. The current flow through four-layer diode 21 therefore tends to reverse direction, thus reducing the current flow to below the holding level to render four-layer diode 21 nonconductive. A diode 29 is connected across capacitor 11 and is poled in a direction to prevent capacitor 11 from charging up in a reverse direction as the magnetic field in the inductive load collapses.

Thus, when a trigger pulse is applied to primary winding 10, controlled rectifier 6 is initially rendered conductive, energizing inductive load device 7. As soon as the controlled rectifier is conductive, timer circuit 2 is activated, and at a predetermined time interval thereafter, a timing pulse is applied to four-layer diode 21. The four-layer diode then becomes conductive providing an output pulse which commutates controlled rectifier 6 and therefore energization of the inductive load ceases. The reverse voltage generated by the inductive load then renders four-layer diode 21 nonconductive, placing the monostable circuit in condition to start the next pulse generating cycle.

Figure 2:
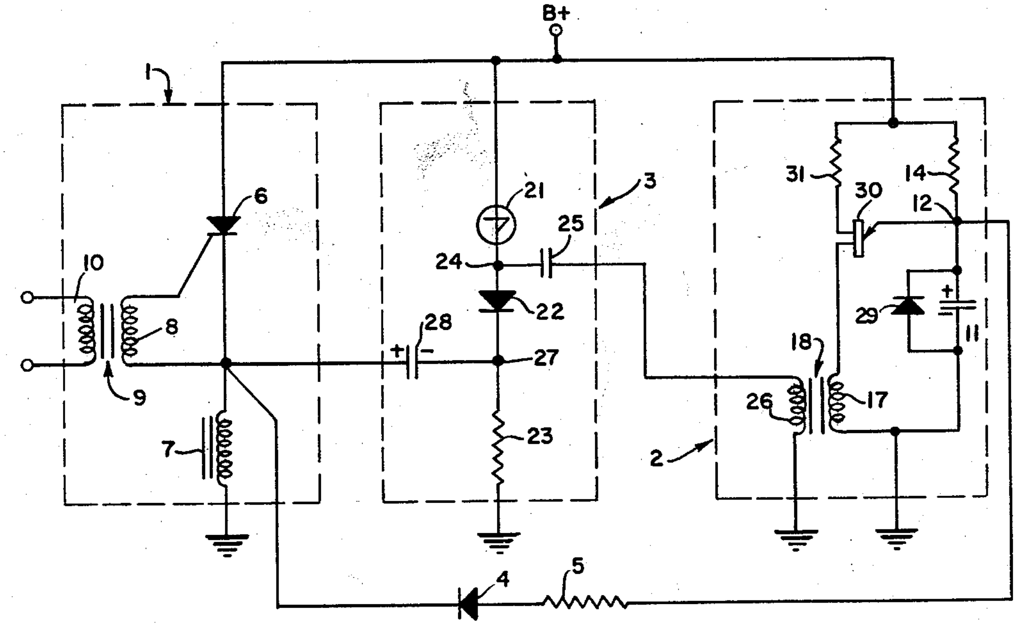
FIG. 2 is a schematic diagram illustrating another embodiment of the invention.

Another embodiment of the invention is illustrated schematically in FIG. 2 where many of the circuit elements are essentially the same and therefore like reference numerals are employed. The essential difference is that an unijunction transistor 30 (FIG. 2) is utilized in place of controlled switch 16 (FIG. 1). One base element of unijunction transistor 30 is connected to the positive source of potential B+ via a resistor 31, the other base element being connected to ground via primary winding 17. The emitter of the unijunction transistor is connected to junction 12.

A characteristic of the unijunction transistor is that the firing potential which renders the transistor conductive is a function of the interbase current, and thus, when connected as shown in FIG. 2, the firing potential of the unijunction transistor becomes a function of the supply voltage. Thus, when the potential across capacitor 11 exceeds this firing potential, the capacitor discharges through the emitter-base circuit of the unijunction transistor to develop a positive pulse across primary winding 17. The time required to develop the timing pulse is not affected by the supply voltage, since the firing potential of the unijunction transistor and the rate at which capacitor 11 charges are both functions of the supply voltage. Preferably, unijunction transistor 30 is selected so that surrounding ambient temperatures have very little effect upon the firing potential.

The operation of the monostable circuit in FIG. 2 is essentially the same as that in FIG. 1. More specifically, a positive trigger pulse initially renders controlled rectifier 6 conductive to energize inductive load 7. As soon as the controlled rectifier is conductive, timing circuit 2 is activated, and at a predetermined time interval thereafter, provides a timing pulse to the cathode of four-layer diode 21. The timing pulse renders the four-layer diode conductive to in turn render controlled rectifier 6 nonconductive. The reverse voltage thereafter generated by inductive load 7 returns four-layer diode 21 to the nonconductive state, and therefore the circuit is again ready to repeat the pulse generating cycle.

It should be noted that the controlled switch 16 in FIG. 1 is capable of producing a larger timing pulse than the unijunction transistor 30 in FIG. 2, thus making the use of the controlled switch somewhat more advantageous in larger installations. Use of the controlled switch also has the advantage that the firing potential can more easily be selected since this is accomplished by properly selecting the resistance values of resistors 19 and 20. In the case of an unijunction transistor, the firing potential is determined primarily by the internal characteristics of the transistor.

While several selected embodiments of the invention have been illustrated in detail, it should be obvious that numerous other embodiments could be conceived within the scope of this invention. The scope of the invention is more particularly defined in the appended claims.

What is claimed is:

1. A monostable pulse generator for providing pulses of uniform duration to energize a load, comprising a source of direct current potential; a normally nonconductive semiconductor rectifier device of the type which is maintained conductive by interal regeneration once conduction has been initiated therein, said rectifier device having an anode directly connected to the positive side of said source, a cathode connected to ground potential through said load, and a gate electrode; trigger circuit means which for each pulse generating cycle supplies a positive pulse to said gate electrode to initiate conduction in said rectifier device causing an energizing pulse to be transmitted to said load; and means including timer means responsive in each pulse generating cycle to the potential drop produced across said load by the energizing pulse energy produced therein when said rectifier device is conductive to produce a positive pulse which is applied directly to the cathode of said rectifier device a predetermined time interval after conduction has been initiated therein to drive that cathode positive with respect to the anode thus commutating the rectifier device and returning it to the nonconductive condition ready for the start of the next pulse generating cycle.

2. The pulse generator circuit in accordance with claim 1, wherein said timer means includes a resistor-capacitor charging circuit connected between ground potential and the positive side of said source, and a first junction point between the capacitor and resistor of said charging circuit is connected through a resistor and a diode in series to a second junction point between the cathode of the rectifier and said load, the poling of said diode being such that when said rectifier is nonconductive so that there is very little potential drop across the load, said diode is forward biased and said first junction point is clamped at essentially ground potential to prevent said capacitor being charged from said source, but when said rectifier becomes conductive the potential drop across said load due to the pulse energy therein increases causing said diode to be back biased and the potential of said first junction point to be free to rise as the capacitor charges from said source to start the timing cycle of the timer circuit.

3. The monostable pulse generator in accordance with claim 2, wherein said timer means includes other resistive means and a second semiconductor rectifier device having a cathode, an anode, and an injector electrode, said injector electrode being biased by a positive potential applied from said source through said other resistive means to start conduction in said second device, said second device having a firing potential between cathode and anode which when exeeded causes conduction to be maintained in said second device by internal regeneration, the injector voltage and the firing voltage varying in accordance with variation of the voltage of said source, said cathode and anode being connected across said capacitor so that when the charge of said capacitor under control of the conductive condition of the first rectifier device exceeds the firing voltage of said second device said capacitor discharges therethrough to produce the timing pulse.

4. The monostable pulse generator in accordance with claim 1, in which the timing pulse produced by said timer means during each cycle of operation is amplified by a pulse amplifier before being applied to the cathode of said rectifier device to restore it to the nonconductive condition and in which said amplifier employs as its active amplifier element a four-layer diode connected in series with the anode-cathode of said rectifier device and said load, the cathode of said four-layer diode being capacitively coupled to the cathode of said rectifier device, which active element is driven to the conductive condition under control of said timing pulse and is returned to the nonconductive condition in response to the collapse of the magnetic field of the load in series therewith when the first rectifier means is caused to become conductive to condition said amplifier for the next pulse generating cycle.

5. The monostable pulse generator in accordance with claim 1, in which said load is highly inductive and said semiconductor rectifier device only is selected to have a high voltage capability in order to withstand the substantial reverse potential or inductive kick generated by the inductive load when said rectifier is conductive tending to vary the time duration of the energizing pulses transmitted to said load.

References Cited by the Examiner

UNITED STATES PATENTS

| | | | |
|---|---|---|---|
| 3,018,392 | 1/62 | Jones et al. | 307—88.5 |
| 3,085,165 | 4/63 | Schaffert et al. | 307—88.5 |

ARTHUR GAUSS, *Primary Examiner.*